(12) United States Patent
Barros et al.

(10) Patent No.: US 7,089,134 B2
(45) Date of Patent: Aug. 8, 2006

(54) METHOD AND APPARATUS FOR ANALYZING GAS FLOW IN A GAS PANEL

(75) Inventors: Philip R. Barros, San Jose, CA (US); Raul A. Martin, Walnut Creek, CA (US); Russell T. Norman, Hollister, CA (US); Chris Melcer, Sunnyvale, CA (US)

(73) Assignee: Applied Materials, Inc., Santa Clara, CA (US)

( * ) Notice: Subject to any disclaimer, the term of this patent is extended or adjusted under 35 U.S.C. 154(b) by 162 days.

(21) Appl. No.: 10/346,515

(22) Filed: Jan. 17, 2003

(65) Prior Publication Data
US 2004/0143404 A1 Jul. 22, 2004

(51) Int. Cl.
*G01F 1/00* (2006.01)
*G01F 7/00* (2006.01)

(52) U.S. Cl. .......................... 702/114; 702/45; 702/50; 702/100

(58) Field of Classification Search .................. 702/24, 702/45, 50, 100, 114; 73/23.2, 861; 137/115.22, 137/240, 597; 422/62, 92
See application file for complete search history.

(56) References Cited

U.S. PATENT DOCUMENTS

| | | | | |
|---|---|---|---|---|
| 5,324,478 A | * | 6/1994 | Mermoud et al. | 422/62 |
| 5,342,580 A | * | 8/1994 | Brenner | 422/92 |
| 6,425,281 B1 | * | 7/2002 | Sheriff et al. | 73/23.2 |
| 6,851,316 B1 | * | 2/2005 | Micke et al. | 73/40.7 |

\* cited by examiner

*Primary Examiner*—Bryan Bui
(74) *Attorney, Agent, or Firm*—Patterson & Sheridan, LLP (57) ABSTRACT

One embodiment of the present invention is a method for analyzing gas flow in a gas transmission unit of a gas panel that includes: (a) monitoring a measure of gas flow output from a mass flow controller included in the gas transmission unit; (b) monitoring a measure of gas pressure output from a pressure regulator included in the gas transmission unit; and (c) analyzing the measure of gas flow and the measure of gas pressure to determine whether gas flow is stable in the gas transmission unit.

18 Claims, 6 Drawing Sheets

METHOD AND APPARATUS FOR ANALYZING GAS FLOW IN A GAS PANEL

TECHNICAL FIELD OF THE INVENTION

One or more embodiments of the present invention relate to method and apparatus for use in manufacturing such as, for example, and without limitation, semiconductor manufacturing.

BACKGROUND OF THE INVENTION

As is well known, manufacturing integrated circuits ("ICs") on substrates such as, for example, and without limitation, semiconductor wafers or glass substrates, requires carrying out many different processing steps in many different semiconductor manufacturing tools, each of which semiconductor manufacturing tools includes a transfer chamber and one or more processing chambers.

A wide variety of gases are used to manufacture the ICs, which gases include, without limitation, inert gases such as, for example, and without limitation, helium, and toxic and/or corrosive gases such as, for example, and without limitation, chlorine. In order to manufacture such ICs properly, the gases must be delivered to the processing chambers in precise amounts. As is well known, a typical semiconductor manufacturing tool utilizes one or more chemical delivery systems to deliver one or more chemicals in gaseous form to various ones of the processing chambers.

Figure 1:
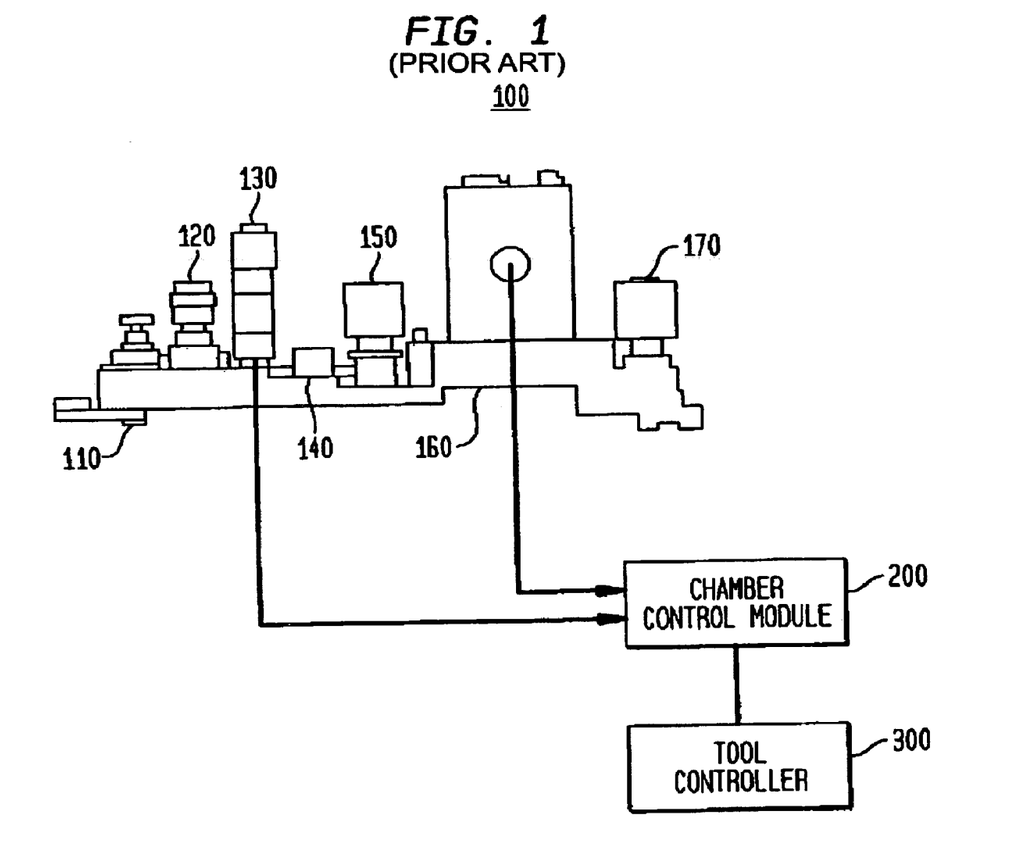
FIG. 1 shows a pictorial representation of a gas transmission unit (typically referred to as a "gas stick") of a gas panel used to supply gas to a processing chamber used to manufacture integrated circuits ("ICs")

As is known, such a chemical delivery system (often referred to in the art as a "gas panel") is typically divided into a number of gas transmission units (one for each gas being used), which gas transmission units are often referred to in the art as "gas sticks." FIG. 1 shows a pictorial representation of typical gas stick 100. In a typical gas panel, signals output from one or more components of gas stick 100 are applied as input to chamber control module 200 ("CCM 200"), which CCM 200 typically includes a central processing unit ("CPU") (not shown). The signals output from the one or more components of gas stick 100 may be in analog or digital form, and in any case, the signals are typically converted into a standard digital protocol such as, for example, and without limitation, the well known "device net" protocol. In a typical case conversion from an analog signal to a digital signal for a particular component is performed on an electronic board associated with the particular component. Then, the CPU in CCM 200, in response to the signals, executes algorithms using predetermined ones of the signals, and applies results therefrom in the form of output signals to semiconductor manufacturing tool controller 300 that is associated with the semiconductor manufacturing tool in a well known manner.

As shown in FIG. 1, gas stick 100 includes manual valve 110. Gas enters gas stick 100 through manual valve 110 at pressures in a range, for example, and without limitation, from about 30 psia to about 45 psia. As is well known, manual valve 110 is utilized to enable manual shut-down of gas stick 100 for safety reasons and for maintenance. Next, the gas passes through pressure regulator 120 and pressure transducer 130 where it exits at a pressure, for example, and without limitation, of about 30 psia. As is well known, because a typical mass flow controller ("MFC") is susceptible to error caused by changes in inlet pressure (for example, MFC 160 in gas stick 100), pressure regulator 120 is used to protect the MFC (for example, MFC 160) from errors that might be caused by sudden changes in inlet pressure. As is well known, pressure transducer 130, located just downstream of pressure regulator 120 in FIG. 1, is used to measure a gas pressure output from pressure regulator 120, and to provide that measurement as an output signal to CCM 200. The pressure measured by pressure transducer 130 is taken to be equal to an inlet gas pressure to MFC 160. As is well known, in accordance with prior art techniques, the output signal from pressure transducer 130 is used for setup of, and for performing maintenance on, gas stick 100.

Next, the gas passes through filter 140, pneumatic valve 150, MFC 160, and finally through pneumatic valve 170 into a processing chamber on the semiconductor manufacturing tool at a processing pressure (for example, and without limitation, in one typical etch application the processing pressure may be about 100 mT). As is well known, filter 140 serves, for example, to remove particles generated in pressure regulator 120, and pneumatic valves 150 and 170 are used for well known control purposes (pneumatic valves 150 and 170 are typically shut when a processing step is not running in the processing chamber).

As is well known, MFC 160 is used to measure and control precisely the gas flow (for example, in units of mass per unit time) being delivered to the processing chamber. A typical MFC has a maximum gas flow, i.e., a full scale gas flow ("F.S."), and typically can control gas flow to any value, typically referred to as a Set Point ("S.P."), in a range between about 10% and about 100% of F.S. to an accuracy of about ±1% of F.S. within ≦about two (2) seconds. A typical MFC produces an output signal that is applied as input to CCM 200 in digital form to provide a measure of gas flow output thereby.

Lastly, as is well known, the above-described components of gas stick 100 are typically mounted on a panel that is often referred to in the art as a substrate.

In accordance with prior art methods, stable flow in gas stick 100 is determined by utilizing the output signal provided by MFC 160 to CCM 200. In particular, in accordance with such prior art methods, once the MFC output signal is within about ±1% of F.S., it is assumed that gas flow in gas stick 100 is stable. In accordance with such prior art methods, since stabilization of the MFC output signal typically occurs within about two (2) seconds, gas flow stabilization is typically deemed to have occurred within about two (2) seconds.

The inventors have discovered that, in practice, gas flow stabilization in a gas stick may take much longer than two (2) seconds. In addition, the inventors have discovered that the amount of time for gas flow to stabilize may depend on the particular gas in the gas stick, and that it may even depend on the age of the gas stick itself. However, if one were to utilize an arbitrarily long stabilization period of, say, ten (10) seconds to overcome this problem, throughput (when measured, for example, as a number of wafers processed per hour) might be negatively impacted since processing would be halted during this long stabilization period. In addition, if such an arbitrarily long stabilization period were still smaller than the amount of time it takes for the gas flow to stabilize, the amount of gas entering the processing chamber may not be the desired amount. This would be problematic for critical processes where the yield per process run (when measured, for example, as the number of properly functioning devices on the substrate) might be negatively impacted.

In light of the above, there is a need for method and apparatus that analyzes gas flow in a gas stick to solve one or more of the above-identified problems.

SUMMARY OF THE INVENTION

One or more embodiments of the present invention advantageously solve one or more of the above-identified problems. In particular, one embodiment of the present invention is a method for analyzing gas flow in a gas transmission unit of a gas panel that comprises: (a) monitoring a measure of gas flow output from a mass flow controller included in the gas transmission unit; (b) monitoring a measure of gas pressure output from a pressure regulator included in the gas transmission unit; and (c) analyzing the measure of gas flow and the measure of gas pressure to determine whether gas flow is stable in the gas transmission unit.

DETAILED DESCRIPTION

FIG. 1 shows a pictorial representation of gas stick 100 of a gas panel used to supply gas to a processing chamber for manufacturing integrated circuits ("ICs"). As described in the Background of the Invention, gas stick 100 is a gas transmission unit that comprises manual valve 110, pressure regulator 120, pressure transducer 130, filter 140, pneumatic valve 150, mass flow controller 160 ("MFC 160"), and pneumatic valve 170. As is further described in the Background of the Invention, a signal output from MFC 160 is applied as input to chamber control module 200 ("CCM 200"), which CCM 200 includes a central processing unit ("CPU") (not shown). The MFC output signal is typically applied to CCM 200 in digital form, for example, and without limitation, in the well known "device net" protocol. Then, in accordance with prior art methods, in response to the MFC output signal, the CPU in CPU 200 determines that gas flow in gas stick 100 is stable once the MFC output signal is within about ±1% of a full scale gas flow ("F.S."). Then, the CPU causes CCM 200 to send a signal indicating that the gas flow is stable to semiconductor manufacturing tool controller 300 that is associated with a semiconductor manufacturing tool in a well known manner. Utilizing such prior art methods, since stabilization of the MFC output signal typically occurs within about two (2) seconds, gas flow stabilization is typically deemed to have occurred within about two (2) seconds.

However, the inventors have discovered that in practice it may take in excess of ten (10) seconds for gas flow in gas stick 100 to stabilize. In particular, the inventors have discovered that this is due to interactions between pressure regulator 120 and MFC 160. Specifically, while pressure regulator 120 is used to protect MFC 160 from large, sudden spikes in line pressure, pressure regulator 120 subjects MFC 160 to a gradual decrease in pressure, referred to in the art as "creep," whenever gas stick 100 is transitioned from a "no-gas-flow" condition (referred to as a "static" condition) to a "gas-flow" condition (referred to as a "dynamic" condition). Such creep occurs, for example, due to mechanical wear in pressure regulator 120.

Figure 2:
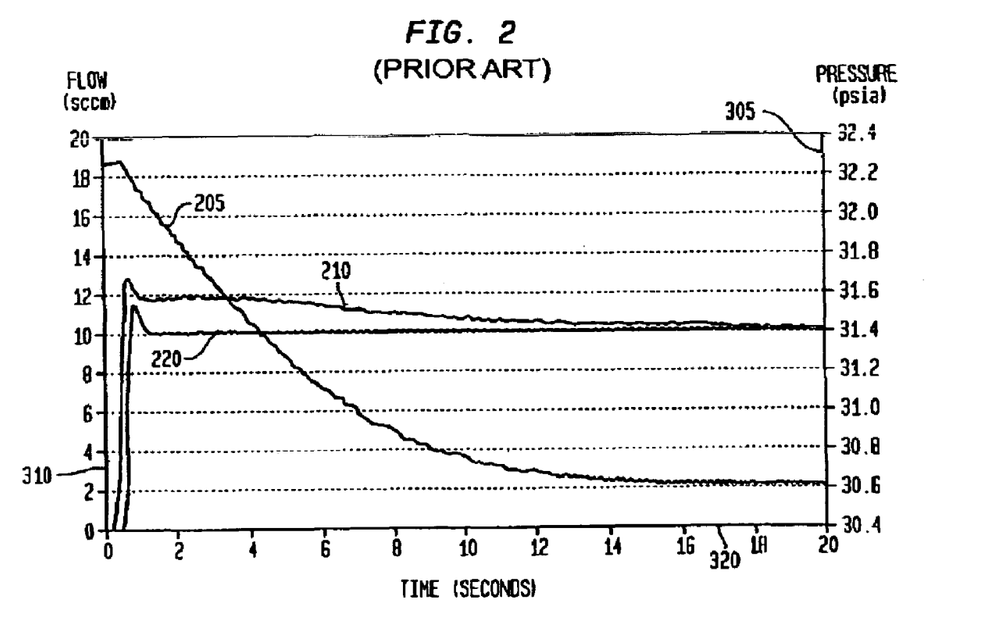
FIG. 2 shows a graph that indicates the existence of an interaction between a pressure regulator and a mass flow controller ("MFC") which form a portion of the gas stick shown in FIG. 1.
Figure 3A:
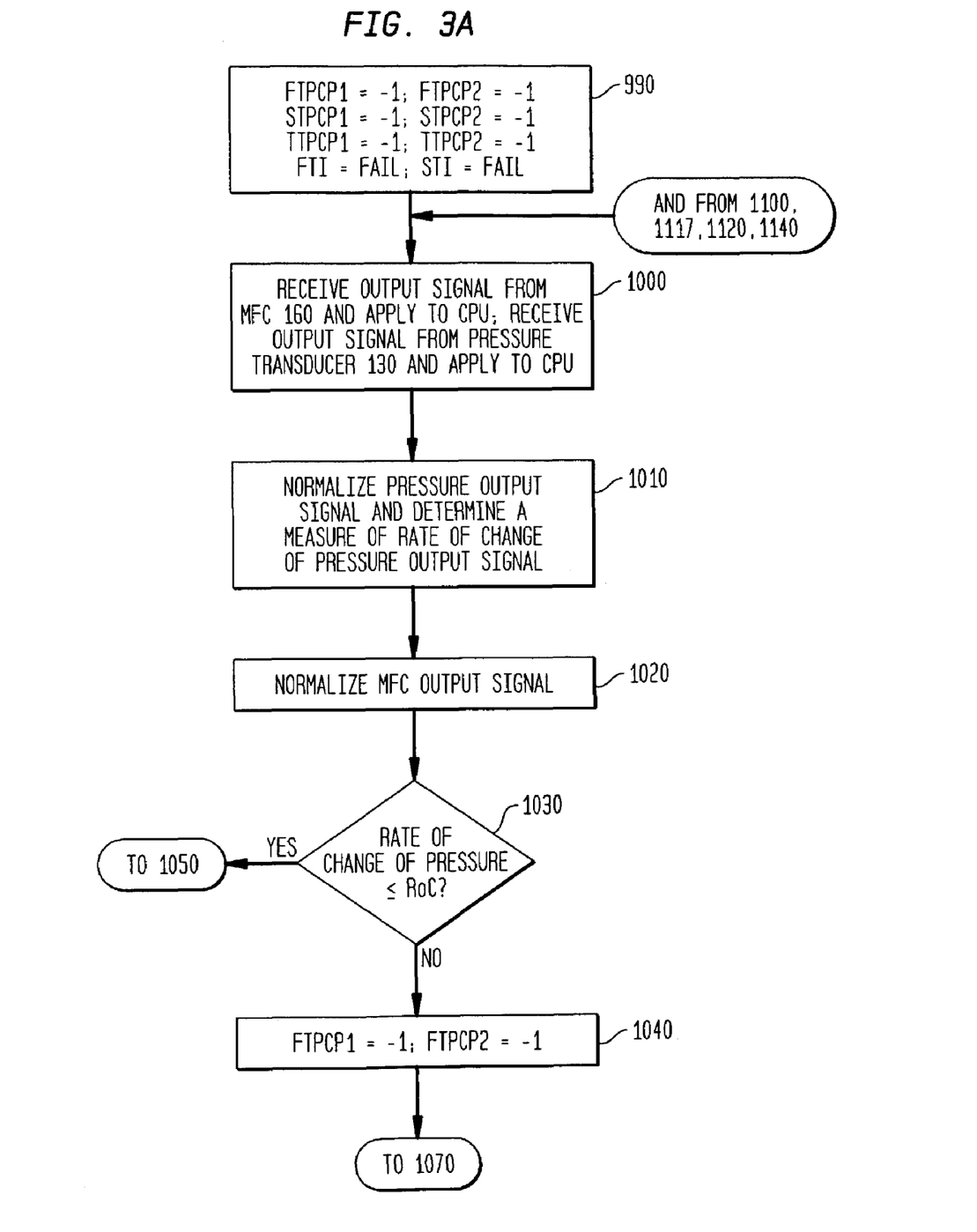
FIG. 3 shows a flow chart of one embodiment of a method for analyzing gas flow in a gas transmission unit of a gas panel in accordance with the present invention.
Figure 3B:
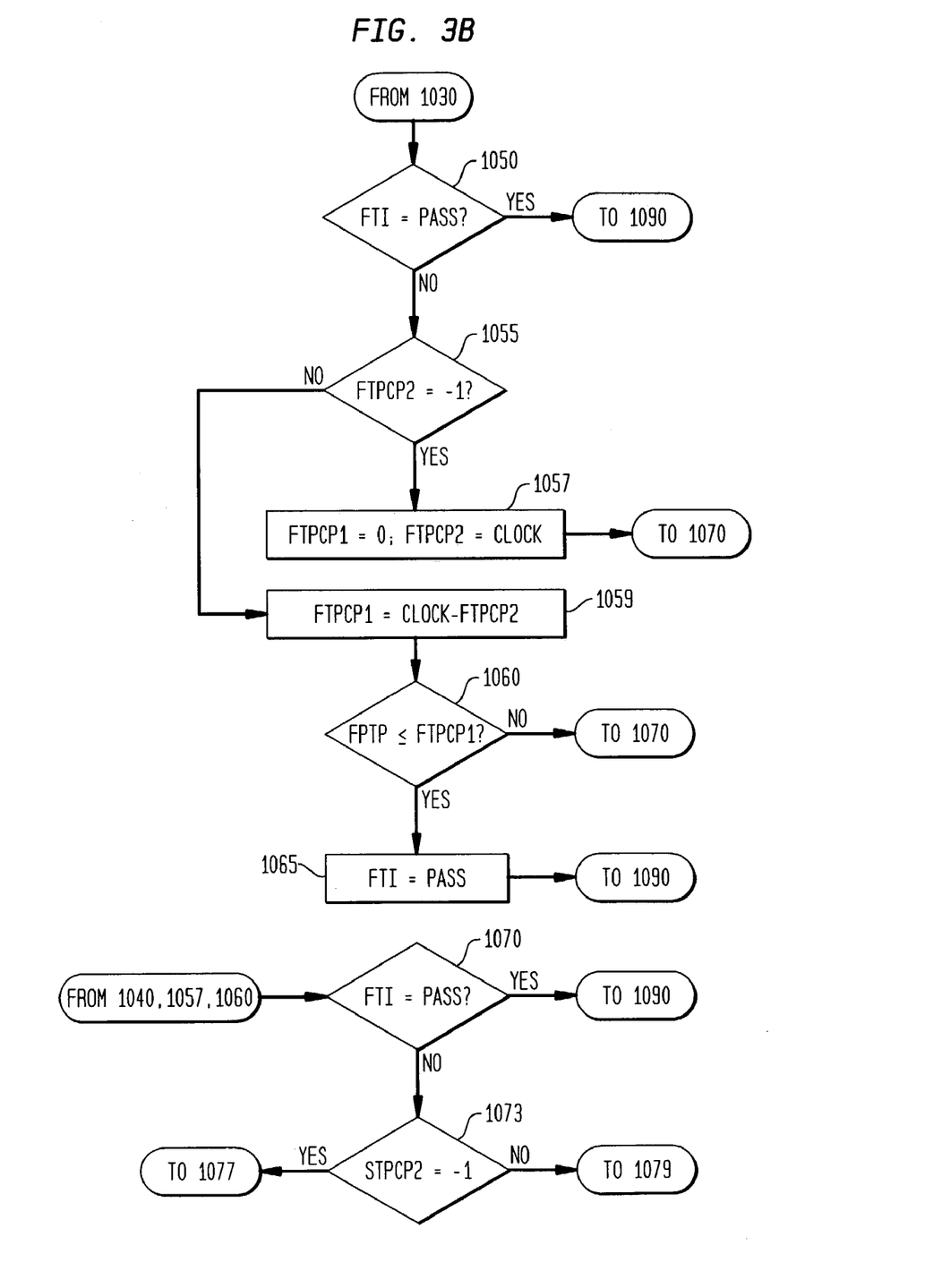
Figure 3C:
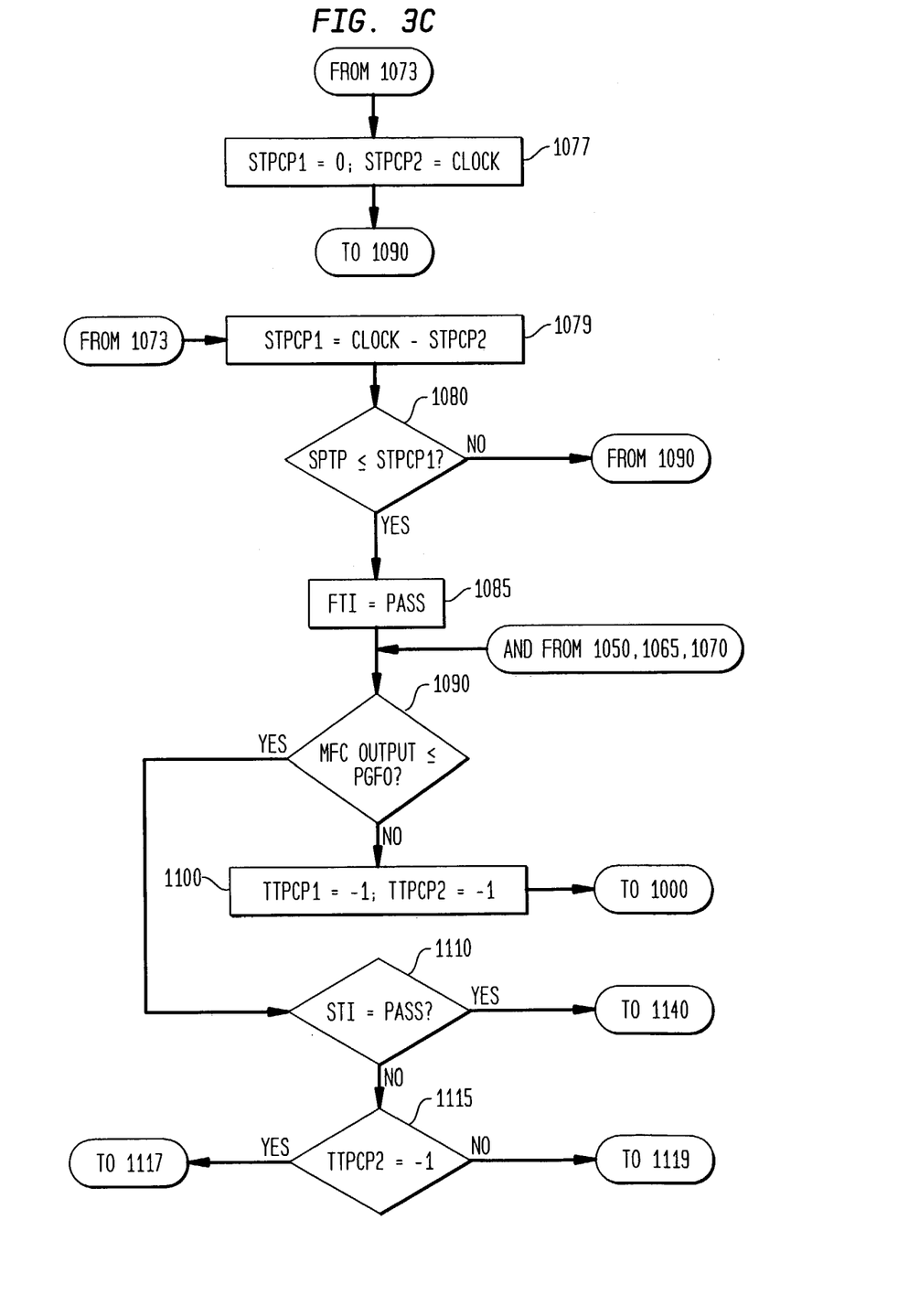
Figure 3D:
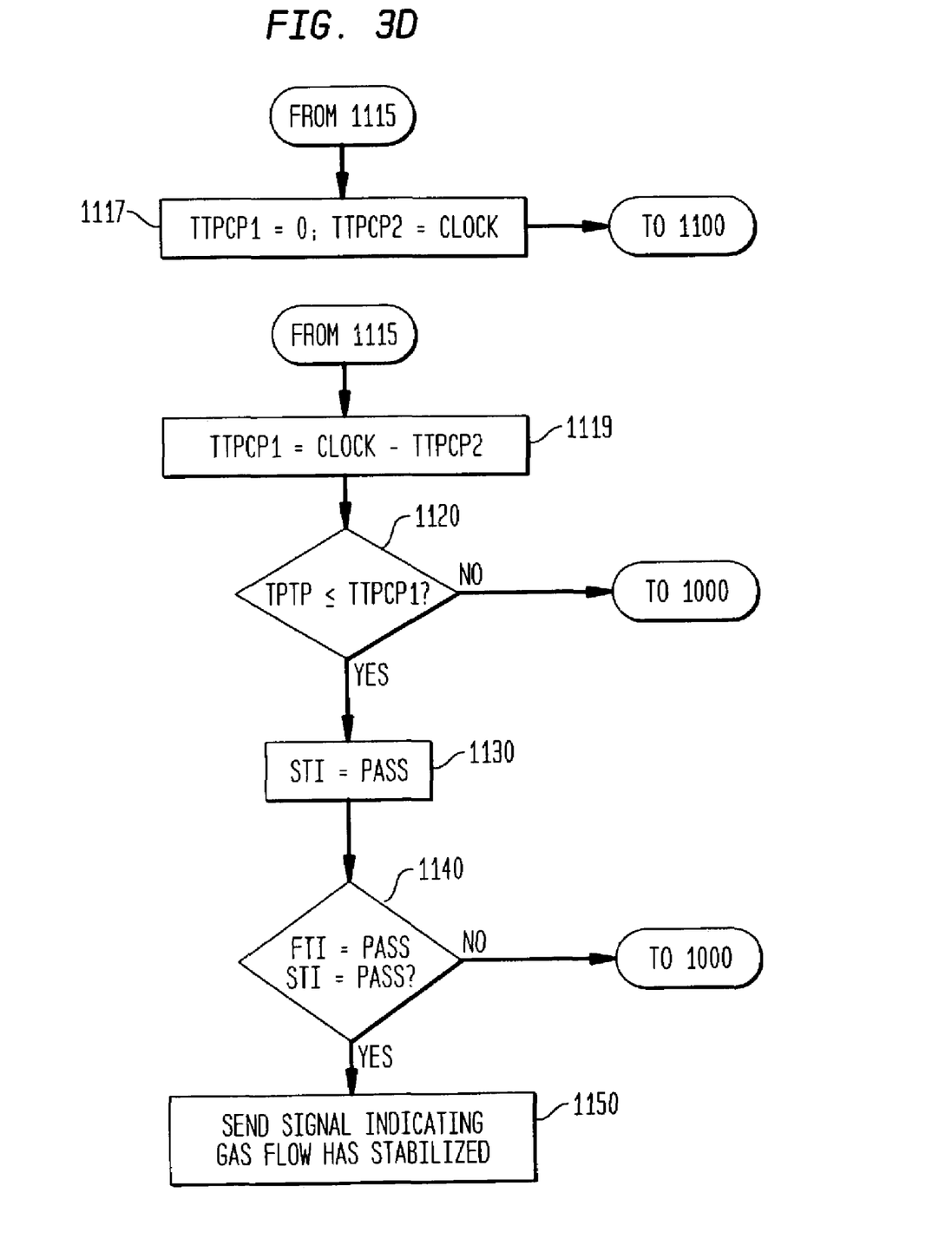

FIG. 2 shows a graph that provides evidence of the interaction between pressure regulator 120 and MFC 160. As shown in FIG. 2, right-hand vertical axis 305 represents gas pressure output from pressure regulator 120 (as measured by pressure transducer 130), left-hand vertical axis 310 represents gas flow (for example, in units of mass per unit time such as standard cubic centimeters per minute or "sccm") output from MFC 160, and horizontal axis 320 represents time. As further shown in FIG. 2, (a) line 205 represents the gas pressure output from pressure regulator 120 (as indicated by a signal output from pressure transducer 130); (b) line 210 represents an actual or measured gas flow output from MFC 160 (as measured in accordance with a rate of rise Nist Traceable Transfer Standard that is well known to those of ordinary skill in the art); and (c) line 220 represents gas flow output from MFC 160 as indicated by an MFC output signal.

Line 200 in FIG. 2 shows that the gas pressure output from pressure regulator 120 decreases from a static pressure value of, for example, about 32.3 psia to a dynamic pressure value of, for example, about 30.6 psia. In addition, the actual (i.e., measured) gas flow output from MFC 160 (as indicated by line 210 in FIG. 2) deviates from a gas flow determined using the MFC output signal (as indicated by line 220 in FIG. 2). As one can readily appreciate from this, errors will occur when the MFC output signal indicated by line 220 is used to determine when gas flow is stable in gas stick 100 in accordance with prior art methods.

The inventors have discovered that the difference in gas flow between the actual (i.e., measured) value, and that determined using the MFC output signal is proportional to a negative of the derivative (i.e., the slope) of the gas pressure output from pressure regulator 120 (for example, and without limitation, as measured by a signal output from pressure transducer 130). In fact, at about the time the prior art methods would have deemed the gas flow to be stable (about two (2) seconds), the actual gas flow is about 20% higher than the gas flow determined using the MFC output signal alone. Specifically, at time=2 seconds, the actual gas flow (from line 210 at time=2 seconds) is 20% higher than the gas flow determined using the MFC output signal (from line 220 at time=2 seconds).

As one can readily appreciate from this, the data shown in FIG. 2 indicates that a semiconductor manufacturer cannot diagnose deviations in gas flow using the MFC output signal alone. In fact, using the MFC signal alone makes it difficult to identify the root cause of process shifts or deviations caused by instabilities in gas flow. In addition, because a pressure regulator is a purely mechanical device, manufacturing variances and long term mechanical drift can alter the performance characteristics thereof. As a result, the amount of time for gas flow to stabilize, as well as the total amount of gas entering the processing chamber, can very over time, as well as from device to device.

In addition to the above-described problem in using the prior art methods, the inventors have discovered another problem that may occur in utilizing the prior art methods. In manufacturing ICs, a processing step is typically qualified on a particular processing chamber, and after qualification, the processing step is transferred to other processing chambers in the IC manufacturing factory. This technique assumes that the performance of each gas stick on the various gas panels is identical, and that the performance does not drift over time. However, the performance drifts identified by the inventors are problematic because of variations in processing results for various chambers in an IC manufacturing factory (this is sometimes referred to in the art as "chamber-to-chamber matching" problems).

To solve one or more of the above-described problems, the inventors have discovered that determining the onset of stable gas flow through a gas transmission unit ("gas stick") of a gas panel to a processing chamber, for example, and without limitation, a processing chamber used to manufacture integrated circuits ("ICs") can be done by: (a) monitoring a measure of gas flow output from a mass flow controller ("MFC") that is utilized to control gas flow to the processing chamber; and (b) by monitoring a measure of gas pressure output from a pressure regulator that is utilized to help protect the MFC from sudden changes in MFC inlet gas pressure. In accordance with one or more embodiments of the present invention, the step of monitoring the measure of gas flow output from the MFC is performed by monitoring an MFC output signal that provides a measure of MFC gas flow output. Further in accordance with one or more embodiments of the present invention, the step of monitoring the measure of gas pressure output from the pressure regulator is performed by monitoring a signal output from a pressure transducer that provides a measure of gas pressure output from the pressure regulator. In accordance with one or more such embodiments of the present invention, the MFC output signal and the pressure transducer output signal are input to CCM 200. As will be described below, and in accordance with one or more embodiments of the present invention, the signals are analyzed in a CPU of the CCM 200 in accordance with an inventive algorithm to determine whether gas flow is stable, and to identify when the gas flow is stable. Then, in accordance with one or more further embodiments of the present invention, in response to such identification, the CPU in CCM 200 provides an indication of stable gas flow to a process tool controller for use in running a semiconductor manufacturing process, for example, by starting a process. Advantageously, in accordance with one or more embodiments of the present invention, processing chamber throughput may be increased, and chamber-to-chamber matching may be improved.

In accordance with one or more embodiments of the present invention, the CPU in CCM 200 carries out the following algorithm to determine whether gas flow is stable, and identifies stable gas flow whenever the following two conditions are satisfied:

(1) a measure of the rate of change of gas pressure output from pressure regulator 120 (dP/dt) (for example, and without limitation, as determined using an output from pressure transducer 130) has reached a value that is less than or equal to a predetermined rate of change for a first predetermined time period, or if a second predetermined time period has elapsed before the measure of the rate of change has reached the value.

(2) a measure of gas flow output from the MFC (for example, and without limitation, as determined using the MFC output signal) is less than a predetermined gas flow output for at least a third predetermined time period.

The predetermined rate of change, the predetermined gas flow output, the first predetermined time period, the second predetermined time period, and the third predetermined time period may be determined routinely by one of ordinary skill in the art without undue experimentation. For example, such quantities may be determined in light of the measurement resolution of the various components. In particular, in accordance with one or more embodiments of the present invention, the predetermined rate of change may be about ±0.1 psia/sec; the first predetermined time period may be about 500 ms; the second predetermined time period may be about ten (10) seconds; the predetermined gas flow output may be about ±1% of Full Scale deviation from its set point; and the third predetermined time period may be about 500 ms.

Then, in accordance with one or more further embodiments of the present invention, whenever the CPU in CCM 200 identifies stable gas flow, it sends a signal to tool controller 300. In response, tool controller 300 may cause processing to start in a processing chamber, or tool controller 300 may wait until all gas flows for a multi-gas process are deemed to be stable before causing processing to start in the processing chamber. Advantageously, this results in increased throughput and yields, and helps to eliminate issues relating to chamber-to-chamber matching.

FIG. 3 shows a flow chart of one embodiment of a method for analyzing gas flow in a gas transmission unit of a gas panel in accordance with the present invention. As shown at box 990 of FIG. 3, the CPU performs the following initialization: first time period counter pair$_1$ ("FTPCP1")=−1; first time period counter pair$_2$ ("FTPCP2")=−1; second time period counter pair$_1$ ("STPCP1")=−1; second time period counter pair$_2$ ("STPCP2")=−1; third time period counter pair$_1$ ("TTPCP1")=−1; third time period counter pair$_2$ ("TTPCP2")=−1; first test indicator ("FTI")="fail"; and second test indicator ("STI")="fail." Control is then transferred to box 1000 of FIG. 3.

As shown at box 1000 of FIG. 3, the output signal from MFC 160 (the "MFC output signal") is applied as input to CCM 200, and digital values representing the output signal are applied as input to the CPU. In addition, the output signal from pressure transducer 130 (the "pressure output signal") is applied as input to CCM 200, and digital values representing the output signal are applied as input to the CPU. Control is then transferred to box 1010 of FIG. 3.

As shown at box 1010 of FIG. 3, the CPU normalizes the pressure output signal in accordance with any one of a number of methods that are well known to those of ordinary skill in the art, and determines a measure of the rate of change of the pressure output signal using the normalized pressure output signal, for example, by computing dP/dt in accordance with any one of a number of methods that are well known to those of ordinary skill in the art. Control is then transferred to box 1020 of FIG. 3.

As shown at box 1020 of FIG. 3, the CPU normalizes the MFC output signal in accordance with any one of a number of methods that are well known to those of ordinary skill in the art. Control is then transferred to decision box 1030 of FIG. 3.

As shown at decision box 1030 of FIG. 3, the CPU determines whether the rate of change of the pressure output signal is less than or equal to a predetermined rate of change ("PRoC"). If so, control is transferred to decision box 1050 of FIG. 3, otherwise, control is transferred to box 1040 of FIG. 3.

As shown at box 1040 of FIG. 3, the CPU initializes as follows: FTPCP1=−1; and FTPCP2=−1. Control is then transferred to decision box 1070 of FIG. 3.

As shown at decision box 1050 of FIG. 3, the CPU determines whether the FTI equals "pass." If so, control is transferred to decision box 1090 of FIG. 3, otherwise, control is transferred to decision box 1055 of FIG. 3.

As shown at decision box 1055 of FIG. 3, the CPU determines whether FTPCP2=−1. If so, control is transferred to box 1057 of FIG. 3, otherwise, control is transferred to box 1059 of FIG. 3.

As shown at box 1057 of FIG. 3, the CPU sets FTPCP1=0; and FTPCP2=a present value of a clock associated with the CPU. Control is then transferred to decision box 1070 of FIG. 3.

As shown at box 1059 of FIG. 3, the CPU sets FTPCP1 equal to the difference between present value of the clock and the clock value stored in FTPCP2. Control is then transferred to decision box 1060 of FIG. 3.

As shown at decision box 1060 of FIG. 3, the CPU determines whether FTPCP1 is equal to or greater than the first predetermined time period ("FPTP"). If so, control is transferred to box 1065 of FIG. 3, otherwise control is transferred to decision box 1070 of FIG. 3.

As shown at box 1065 of FIG. 3, the CPU sets FTI equal to "pass." Control is then transferred to box 1090 of FIG. 3.

As shown at decision box 1070 of FIG. 3, the CPU determines whether the FTI indicator equals "pass." If so, control is transferred to decision box 1090 of FIG. 3, otherwise, control is transferred to decision box 1073 of FIG. 3.

As shown at decision box 1073 of FIG. 3, the CPU determines whether STPCP2=−1. If so, control is transferred to box 1077 of FIG. 3, otherwise, control is transferred to box 1079 of FIG. 3.

As shown at box 1077 of FIG. 3, the CPU sets STPCP1=0; and STPCP2=the present value of the clock. Control is then transferred to box 1090 of FIG. 3

As shown at box 1079 of FIG. 3, the CPU sets STPCP1 equal to the difference between present value of the clock and the clock value stored in STPCP2. Control is then transferred to decision box 1080 of FIG. 3.

As shown at decision box 1080 of FIG. 3, the CPU determines whether STPCP1 is equal to or greater than the second predetermined time period ("SPTP"). If so, control is transferred to box 1085 of FIG. 3, otherwise control is transferred to decision box 1090 of FIG. 3.

As shown at box 1085, the CPU sets the FTI equal to "pass." Control is then transferred to decision box 1090 of FIG. 3.

As shown at decision box 1090 of FIG. 3, the CPU determines whether the MFC output signal is less than or equal to a predetermined gas flow output ("PGFO"). If so, control is transferred to decision box 1110 of FIG. 3, otherwise, control is transferred to box 1100 of FIG. 3.

As shown at box 1100 of FIG. 3, the CPU initializes as follows: TTPCP1=−1; and TTPCP2=−1. Control is then transferred to box 1000 of FIG. 3.

As shown at decision box 1110 of FIG. 3, the CPU determines whether the STI equals "pass." If so, control is transferred to decision box 1140 of FIG. 3, otherwise, control is transferred to box decision 1115 of FIG. 3.

As shown at decision box 1115 of FIG. 3, the CPU determines whether TTPCP2=−1. If so, control is transferred to box 1117 of FIG. 3, otherwise, control is transferred to box 1119 of FIG. 3.

As shown at box 1117 of FIG. 3, the CPU sets TTPCP1=0; and TTPCP2=the present value of the clock. Control is then transferred to box 1000 of FIG. 3.

As shown at box 1119 of FIG. 3, the CPU sets TTPCP1 equal to the difference between present value of the clock and the clock value stored in TTPCP2. Control is then transferred to decision box 1120 of FIG. 3.

As shown at decision box 1120 of FIG. 3, the CPU determines whether TTPCP1 is equal to or greater than the third predetermined time period ("TPTP"). If so, control is transferred to box 1130 of FIG. 3, otherwise control is transferred to box 1000 of FIG. 3.

As shown at box 1130 of FIG. 3, the CPU sets the STI equal to "pass." Control is then transferred to decision box 1140 of FIG. 3.

As shown at decision box 1140 of FIG. 3, the CPU determines whether the FTI and STI equal "pass." If so, control is transferred to box 1150 of FIG. 3, otherwise, control is transferred to box 1000 of FIG. 3.

As shown at box 1150 of FIG. 3, the CPU outputs a signal indicating that gas flow has stabilized.

Those skilled in the art will recognize that the foregoing description has been presented for the sake of illustration and description only. As such, it is not intended to be exhaustive or to limit the invention to the precise form disclosed. Although the embodiments above disclosed an algorithm being executed in a CPU associated with CCM 200, further embodiments of the present invention are not limited thusly. In fact, further embodiments of the present invention exist wherein the algorithm is executed in any CPU, not merely one associated with CCM 200. For example, the CPU may be associated with the semiconductor manufacturing tool controller, or it may even be remote from the semiconductor manufacturing tool.

What is claimed is:

1. A method for analyzing gas flow in a gas transmission unit of a gas panel associated with a manufacturing tool, comprising:

monitoring a measure of gas flow output from a mass flow controller ("MFC") included in the gas transmission unit;

monitoring a measure of gas pressure output from a pressure regulator included in the gas transmission unit; and analyzing the measure of gas flow output and the measure of gas pressure to determine whether gas flow is stable in the gas transmission unit; wherein the step of analyzing further comprises:

determining a measure of a rate of change of gas pressure output from the pressure regulator;

analyzing the measure of the rate of change of the gas pressure and the measure of the gas flow output from the MFC to determine whether gas flow through the gas transmission unit is stable; and determining whether the measure of the rate of change of the gas pressure has reached a value that is less than or equal to a predetermined rate of change for a first predetermined time period, or if a second predetermined time period has elapsed before the measure of the rate of change has reached the value;

determining whether the measure of the gas flow output from the MFC is less than a predetermined gas flow output for at least a third predetermined time period; and determining that the gas flow is stable when both preceding steps are affirmatively satisfied.

2. The method of claim 1 wherein the step of monitoring the measure of gas flow output from the MFC comprises monitoring a signal output from the MFC.

3. The method of claim 2 wherein the step of monitoring in-situ the measure of gas pressure output from the pressure regulator comprises monitoring a signal output from a pressure transducer included in the gas transmission unit and disposed to measure gas pressure output from the pressure regulator.

4. A method for analyzing gas flow in a gas transmission unit of a gas panel associated with a manufacturing tool, comprising:

determining if a measure of gas flow output from a mass flow controller ("MFC") included in the gas transmission unit meets a first predefined criteria;

determining if a measure of gas pressure output from a pressure regulator included in the gas transmission unit upstream of the MFC meets a second predefined criteria; and commencing processing in the manufacturing tool in response to meeting the first and second predefined criteria.

5. The method of claim 4, wherein the step of determining if the measure of gas pressure output meets the second predefined criteria further comprises:

measuring a rate of pressure change of the gas pressure output.

6. The method of claim 5, wherein the step of determining if the measure of gas pressure output meets the second predefined criteria further comprises:

determining if the measured rate of pressure change has reached a value that is less than or equal to a predetermined rated of change for a first time period.

7. The method of claim 6, wherein the first time period is about 500 ms.

8. The method of claim 6, wherein the predetermined rate of change is about plus or minus 0.1 psia/sec.

9. The method of claim 4, wherein the step of determining if the measure of gas pressure output meets the second predefined criteria further comprises:

determining if the measured rate of pressure change has reached a value that is less than or equal to a predetermined rated of change for a first time period or if a second predetermined period has elapsed before the measure of rate of change has been reached.

10. The method of claim 4, wherein the step of determining if the measure of gas flow output meets the first predefined criteria further comprises:

determining if the measure of gas flow output is less than a predetermined gas flow output for a third predetermined period of time.

11. The method of claim 10, wherein the third time period is about 500 ms.

12. The method of claim 10, wherein the predetermined rate of flow output is about plus or minus 1 percent of Full Scale deviation from a set point of the mass flow meter.

13. A method for analyzing gas flow in a gas transmission unit of a gas panel associated with a manufacturing tool, comprising:

providing, in the gas transmission unit, flow circuit comprising a mass flow controller ("MFC") coupled downstream of a pressure transducer, the pressure transducer coupled downstream of a pressure regulator;

flowing gas through the flow circuit in a non-choked condition;

analyzing outputs from the MFC and the pressure transducer in a tool controller to determine whether the gas flow is stable; and commencing processing in response to a determination that the flow is stable.

14. The method of claim 13, wherein the step of analyzing further comprises:

determining if a measured rate of pressure change has reached a value that is less than or equal to a predetermined rated of change for a first time period.

15. The method of claim 14, wherein the step of analyzing further comprises:

determining if the measure of gas flow output is less than a predetermined gas flow output for a third predetermined period of time.

16. The method of claim 13 further comprising:

commencing processing in response to a determination that;

a) a determination that a measured rate of pressure change has reached a value that is less than or equal to a predetermined rated of change for a first time period; and b) a determination that a measure of gas flow output is less than a predetermined gas flow output for a third predetermined period of time.

17. The method of claim 16, wherein the first time period is less than the second time period.

18. The method of claim 16, wherein the predetermined rate of change is about plus or minus 0.1 psia/sec and the predetermined rate of flow output is about plus or minus 1 percent of Full Scale deviation from a set point of the mass flow meter.

* * * * *